(12) United States Patent
Kalambur et al.

(10) Patent No.: US 6,549,926 B1
(45) Date of Patent: Apr. 15, 2003

(54) SRT DIVIDER HAVING SEVERAL BITS OF EACH PARTIAL REMAINDER ONE-HOT ENCODED TO MINIMIZE THE LOGIC LEVELS NEEDED TO ESTIMATE QUOTIENT BITS

(75) Inventors: Atul Kalambur, Palo Alto, CA (US); Srinivasa Gopaladhine, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/427,366

(22) Filed: Oct. 26, 1999

(51) Int. Cl.[7] .................................................. G06F 7/52

(52) U.S. Cl. ....................................................... 708/650

(58) Field of Search ................................. 708/650–656

(56) References Cited

U.S. PATENT DOCUMENTS 5,329,476 A * 7/1994 Williams .................... 708/650
5,870,323 A    2/1999 Prabhu et al. .............. 364/761

OTHER PUBLICATIONS

167 MHz Radix–8 Divide and Square Root Using Overlapped Radix–2 Stages, Prabhu & Zyner, 1995.
SRT Division Architectures and Implementations, Harris et al., 1997.

* cited by examiner

Primary Examiner—Tan V. Mai
(74) Attorney, Agent, or Firm—Gunnison, McKay & Hodgson, L.L.P.; Philip McKay (57) ABSTRACT

A Sweeney, Robertson, Tocher (SRT) divider for use in a computer system has recoding circuitry to recode the three most significant bits of the dividend into one-hot form as the dividend is loaded into a quotient/partial remainder register. With each clock, a partial remainder is generated also having its most significant three bits in one-hot form and the remaining bits in binary encoded form.

The divider has several stages permitting it to generate several bits of quotient in each clock cycle. Each stage has circuitry for estimating a quotient digit, and for computing a partial remainder by subtracting the product of the quotient digit times the divisor from either the dividend or a previous partial remainder. This subtraction is performed upon a one-hot code in the most significant bits and in binary code on the least significant bits. The divider also has circuitry for assembling a plurality of quotient digits into a quotient.

10 Claims, 6 Drawing Sheets

SRT DIVIDER HAVING SEVERAL BITS OF EACH PARTIAL REMAINDER ONE-HOT ENCODED TO MINIMIZE THE LOGIC LEVELS NEEDED TO ESTIMATE QUOTIENT BITS

FIELD OF THE INVENTION

This invention relates to the field of high-speed division hardware for general purpose computer systems. In particular, it relates to the class of S.R.T. dividers capable of producing multiple bits of quotient per clock cycle through cascaded divider stages.

BACKGROUND OF THE INVENTION

Classical binary (radix-2) restoring, nonperforming, and nonrestoring dividers typically require one iteration or cycle, or one full divider stage, per bit of quotient generated. With these dividers, 32 cycles are required for division of a 64-bit dividend by a 32-bit divisor to produce a 32-bit quotient.

Dividers that operate in a radix greater than two, such as in radix 4 or radix 8 offer the possibility of performing division in fewer cycles or stages than radix 2 dividers. Radix 4 dividers can divide a 64-bit dividend by a 32 bit divisor to produce a 32 bit quotient in 16 cycles or stages, plus overhead, by producing two bits of quotient in each cycle. A radix 8 divider can perform this division in 11 cycles or stages, plus overhead, by producing three bits of quotient per cycle or divider stage.

Dividers that implement two or more cascaded divider stages can produce more than one quotient bit per cycle. These dividers can be challenging to build because of the amount of logic required.

SRT division has been in the news because a look-up-table having an incorrect entry in early Pentium processors. This division method, named after D. Sweeney, J. Robertson, and K. Tocher, is a nonrestoring division algorithm using a signed quotient digit set.

Prabhu, et al., describe an effectively radix 8 SRT divider in U.S. Pat. No. 5,870,323. Radix 8 SRT dividers like that of Prabhu, et al., may be used in high speed processors to produce more than one quotient bit per clock cycle.

SRT division is performed by iterating a sequence of a. estimating one or more digits of quotient, based on the most significant bits, including sign, of the dividend or partial remainder and the divisor. The quotient digit may represent one or more bit positions in the eventual quotient.

b. subtracting a product of the quotient digit times the divisor from the dividend or partial remainder to form a new partial remainder. This subtraction is often performed in carry-save form in the least significant bits, but carry must be propagated in the most significant bits during either the subtraction or during the estimation of the next one or more digits of quotient.

c. shifting the quotient digit into a quotient register.

d. shifting the new partial remainder by at least one bit position(s) and iterating steps a, b, and c until sufficient digits of quotient have been obtained.

The divider of Prabhu, et al., has several, preferably three, overlapped stages of radix-2 SRT division to provide the effect of a high radix, preferably radix-8, divider. Three bits of quotient are generated in each clock cycle, one bit from each of the overlapped stages.

In each stage, a quotient selection logic look-up table, which may be implemented as logic gates, ROM or PLA, generates each estimate of quotient bits. Multiple quotient bit estimation logic circuits operating in sequence are provided to produce several quotient digits in each clock cycle. In parallel with the estimation of a first, a second, and a third digit, the divisor is multiplied by all possible values of the digit estimates, and these values are subtracted from the dividend or partial remainder to form a set of differences in carry-save form. A multiplexor, controlled by the estimates, then selects a new partial remainder from the set of differences. This computation of several possible differences, followed by selection of the difference corresponding to the digit generated, is speculative execution. In Prabhu's divider, the partial remainder is recycled in carry-save form, and speculative execution is used to achieve high-speed execution at the cost of many more carry-save adders than would be required without speculative execution.

It is known that SRT division can be performed with less speculative execution than in the divider of Prabhu, et. al. In this technique, quotient digit estimates are computed as described. The digit estimate is used to control a multiplexor that selects the divisor multiple corresponding to the digit, the selected divisor multiple is then subtracted from the dividend or partial remainder to form a new partial remainder.

One-hot encoding is known to be an alternative method of representing numbers or parts of numbers. One-hot encoding requires a number of lines equal to two raised to the power of the number of equivalent binary bits of the number or part of a number to be represented; hence one-hot encoding three binary bits requires eight lines, one-hot encoding four bits requires sixteen lines, etc. One-hot encoding is therefore rarely used to represent large numbers.

It is known that adding to one-hot encoded numbers is equivalent to shifting the one-hot encoded number by a number of bit positions equal to the number added to the one-hot encoded number. For example, two in eight-line one-hot encoded form is 0000 0100. Adding three to this is equivalent to left shifting by three places, to produce 0010 0000, or five in one-hot form.

SUMMARY OF THE INVENTION

It has been found that, if the most significant bits of partial remainder are generated initially in one-hot encoded form, it is possible to reduce the number of logic levels, and hence the time required for generation of each successive partial remainder. The one-hot encoded form of the most significant bits of the partial remainder is then recoded into a binary form when carry is propagated to produce a final remainder.

The reduction of logic levels occurs in part because one-hot encoded addition or subtraction is equivalent to a shift operation, with no need to separately propagate a carry signal, and in part because with a one-hot encoded partial remainder, few levels of logic are necessary to estimate each quotient digit.

It has also been found that with the most significant bits of the partial remainder in one-hot encoded form, the quotient digit estimate can be computed quickly enough that it is possible, in some dividers, to avoid using speculative execution logic during computation of the binary encoded less bits of each partial remainder.

DETAILED DESCRIPTION OF THE PREFERRED EMBODIMENTS

Figure 1:
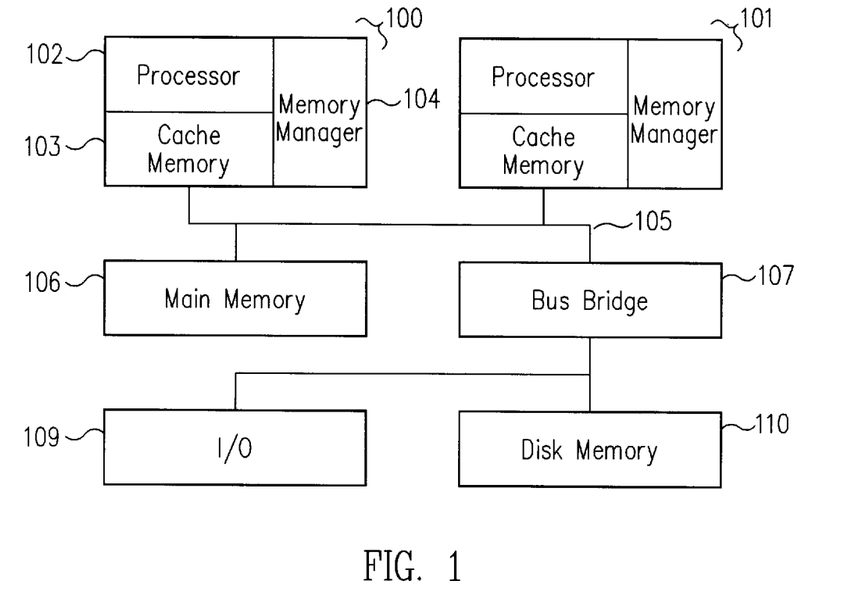
FIG. 1 is a block diagram of a generalized computer system.

Many computer systems used today, such as those portrayed in FIG. 1, have a processing element 100. One or more additional processing elements 101 may also be present, as is supported by symmetric multiprocessing operating systems including Solaris, Linux, and Windows NT. Each processing element usually has a processor 102, a Cache memory 103, and a memory manager 104 that determines which memory addresses are cacheable and translates memory addresses from a virtual address space to a physical address space.

Each processing element 100 communicates over one or more data busses 105 to a main memory 106, which may include additional memory management and caching functions, and, often through a bus bridge 107 and an additional bus 108, to I/O devices 109, including disk memory devices 110. There are many ways of implementing such computer systems, for example some of the I/O functions 109, including the Disk Memory 110, may communicate directly with the main memory.

Figure 2:
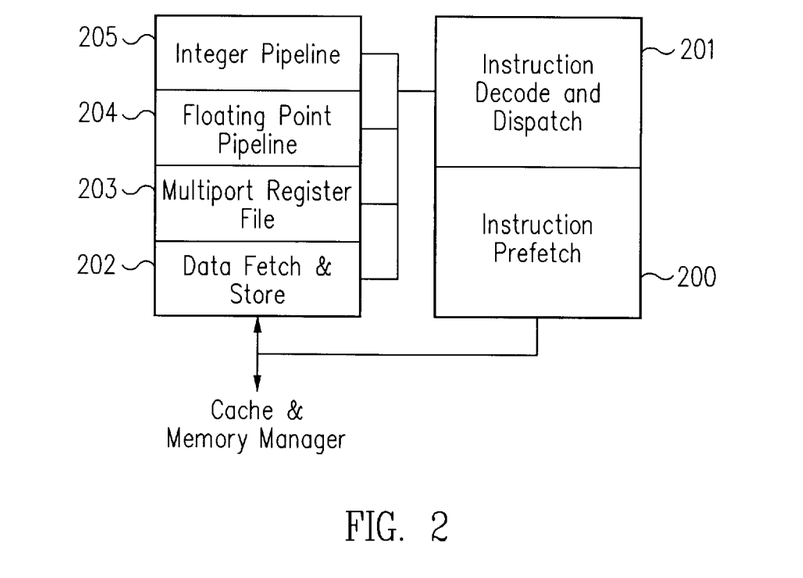
FIG. 2 a block diagram of the processor of the generalized computer system.

In the processor 102 of each processing element, as shown in FIG. 2, there is usually a unit for fetching instructions and tracking instruction addresses 200, an instruction decoder and dispatcher 201, and a data fetch and store unit 202 that conducts data transfers between a multiport register file 203 and the various memory and I/O devices of the system, including the cache memory 103, main memory 106, disk memory 110 and I/O devices 109. There are also usually a floating point execution pipeline 204 and an integer execution pipeline 205 that receive data from the multiport register file 203, operate upon it, and write results back to the multiport register file 203. The floating point execution pipeline 204 and integer execution pipeline 205 may alternatively be combined into one unit; or a single divider may be shared by both units to perform integer division and division of floating point mantissas.

Figure 3:
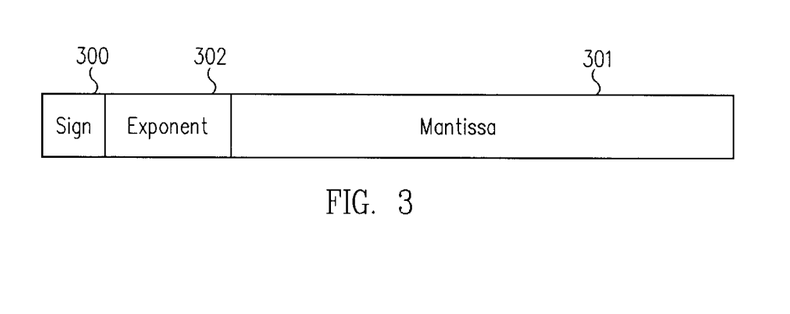
FIG. 3 an illustration of the bit fields of a floating point number as often used in typical computer systems.

Floating point numbers, as shown in FIG. 3, are usually comprised of three separate fields. A sign bit 300 represents whether the number is positive or negative. The magnitude of the floating point number is that of the mantissa field value 301 multiplied by a base value raised to the power indicated by an exponent field 302. The base value is fixed for each floating point format, two being a common base value. The IEEE 754 specification provides detailed descriptions of a single precision floating point format, where all three fields fit in a 32-bit word and having 24 bits (including one hidden bit) of mantissa, and a double precision floating point format where all three fields fit in a 64-bit word and having 52 bits allocated to the mantissa. One extra, or hidden, mantissa bit is available because of the way in which normalization is performed, so the mantissa is effectively a 53 bit number. The mantissa portion of the number is always positive, negative numbers are represented through the sign bit; hence the product of a pair of mantissas is always positive.

The bits of the operand are numbered for purposes of this discussion such that bit 0 is the least significant bit of the mantissa. For a single precision operand, bit 31 is the sign bit, and bit 22 the most significant bit of the mantissa (there is one additional "hidden" bit). Similarly, for double precision operands, bit 63 is the sign bit, the hidden bit is the most significant bit of the mantissa, and bit 51 the second most significant bit of the mantissa with bit 0 the least significant bit of mantissa.

Figure 4:
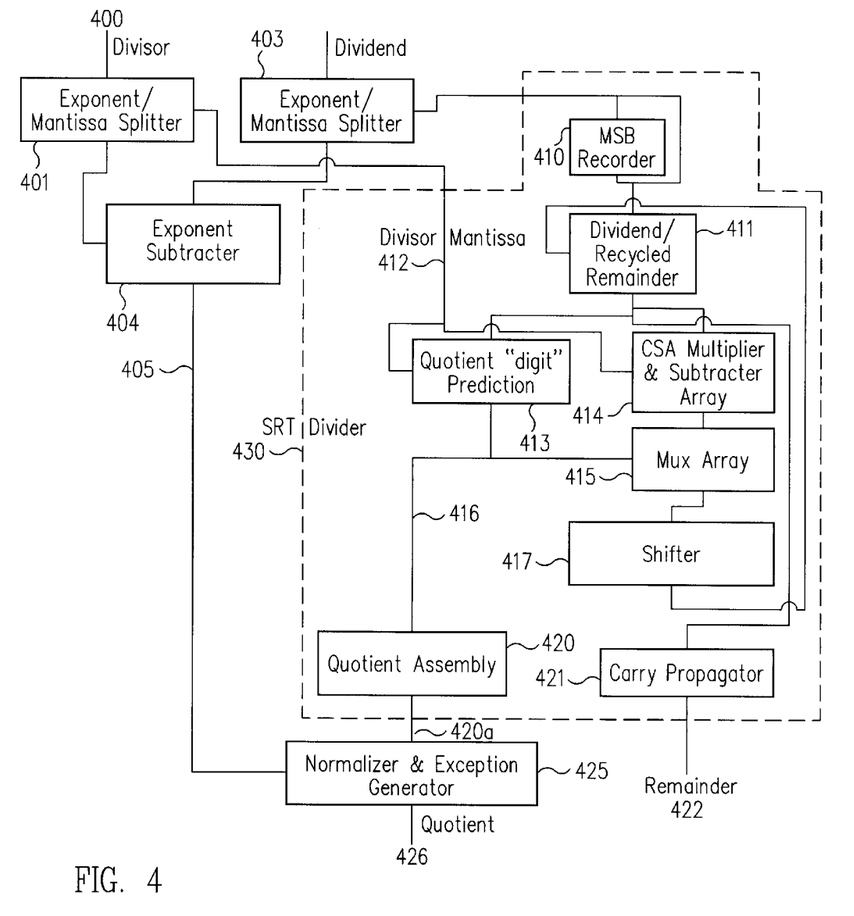
FIG. 4 a block diagram of a portion of a floating point pipeline, showing an SRT divider generating one quotient bit per cycle.

FIG. 4 illustrates the functions performed by a floating point pipeline, embodying the present invention, during execution of a floating point division. Pipeline registers are not shown. This figure illustrates a single-stage divider.

A floating point divisor 400 is split into an exponent, a sign, and a mantissa field by exponent/mantissa splitter 401. Similarly, a floating point dividend 402 is split into its exponent, sign, and mantissa fields by exponent mantissa splitter 403. The sign path is not shown. An exponent subtractor 404 subtracts the divisor exponent from the dividend exponent to produce a raw quotient exponent 405.

The dividend mantissa is fed through an MSB recoder 410 to a Dividend/recycled remainder register 411. MSB recoder 410 operates on the most significant three bits of the dividend, recoding these bits in one-hot form, while passing less significant bits unaltered.

The most significant bits of the dividend mantissa from the dividend/recycled remainder register 411 and the most significant bits of the divisor mantissa 412 (for radixes greater than two) from the divisor exponent/mantissa splitter are fed to a quotient digit predictor 413. Simultaneously, the divisor mantissa 412 is fed to a carry-save-adder (CSA) based, multiplier & subtractor array 414. For speed, the multiplier and subtractor array 414 has two sections, a first section generates products of all possible values of quotient digit 413 times the divisor 412, and a second section subtracts these products from the dividend/recycled remainder register 411, generating a set of outputs of all possible differences of the dividend/recycled remainder register and products of the divisor times a quotient digit. Multiplexor array 415 selects the member of the set of all possible differences corresponding to the predicted quotient digit 416 from quotient digit predictor 413. The selected difference from multiplexor array 415 is shifted left by shifter 417, recoded as necessary such that the equivalent of its most significant three bits are in one-hot form, and recycled into the dividend/recycled remainder register 411 as a partial remainder (PR).

Each predicted quotient digit 416 is assembled in a quotient assembly register 420. This process is iterated until all desired quotient bits have been assembled. When all desired quotient bits are assembled, redundancy in the quotient is removed by propagating carry in the quotient assembly register 420 to form a raw mantissa quotient 420a; and carry may optionally be propagated by carry propagator 421 on the contents of the dividend/recycled remainder register 411 to form a remainder 422. The raw mantissa quotient 420a and the raw quotient exponent 405 are then normalized by Normalizer and Exception Generator 425 to form a floating point quotient 426. In event of divide overflow or other error conditions, Normalizer and Exception Generator 425 generates an exception or error flag and an error or not-a-number code for the floating point quotient 426 according to the rules of IEEE 754.

The MSB recoder 410, Dividend/recycled remainder register 411, quotient digit predictor 413, CSA Multiplier and Subtractor array 414, multiplexor array 415, shifter 417, quotient assembly register 420, and carry propagator 421, with associated control logic including an iteration counter to control iteration of the division, together comprise the SRT divider 430.

The primary advantage of this SRT divider is that, with one-hot coding of the most significant bits of dividend/recycled remainder register 411, fewer levels of logic are required for paths through the quotient digit predictor 413, CSA Multiplier & subtractor array 414, Multiplexor array 415, and shifter 417 than with ordinary binary coding. This results in part because carry propagation is inherent during subtraction of the one-hot encoded most significant bits of the dividend/recycled remainder, the only bits over which carry must be propagated during each cycle. A multiplexor array, or barrel, shifter is used for this one-hot encoded subtractor.

FIG. 4 portrays a basic SRT divider that produces one quotient bit per cycle of the iterative division process. The iterative process may be, and preferably is, unrolled to provide for generation of two, three, or more bits of quotient per cycle.

Figure 5:
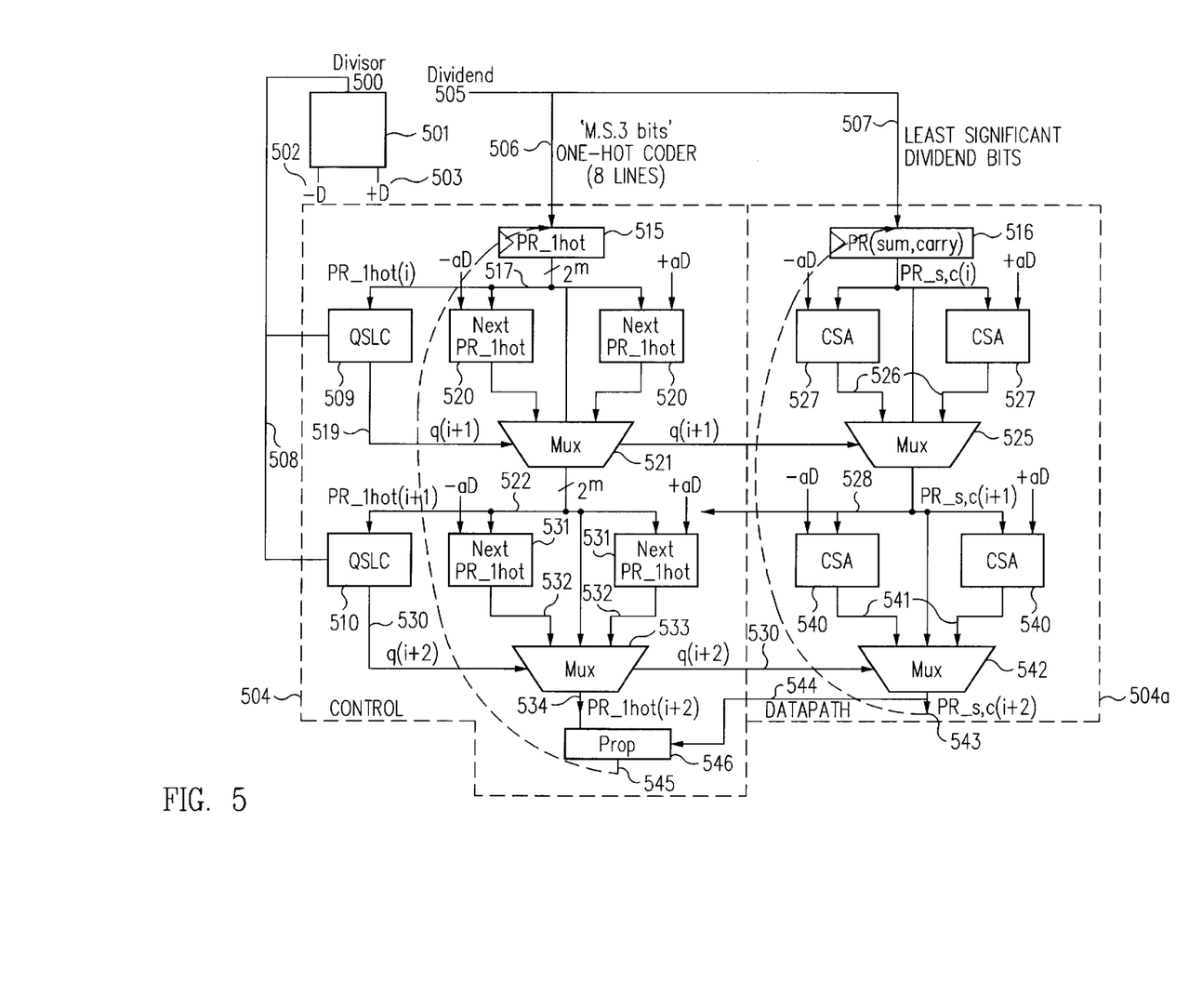
FIG. 5 a block diagram of the core of an SRT divider embodying the present invention and generating two quotient bits per cycle with speculative execution.

The core of an SRT divider embodying one-hot coding of the most significant bits of the dividend and unrolled to generate two bits of quotient per cycle is detailed in FIG. 5. The divisor 500 enters a divisor multiplier 501 that generates the possible products of possible quotient digits times the divisor, including negative one times the divisor 502 and one times the divisor 503. A third possible product, zero, equal to a possible quotient digit of zero times the divisor, is optimized out of the logic. The divider is divided into a control section 504 that operates upon the one-hot coded portion 506 of the dividend or partial remainder 515, and a datapath section 504a that operates upon the binary encoded portion 507 of the dividend or partial remainder.

A dividend 505 enters with its most significant binary three bits recoded into eight lines of one-hot encoded form 506. Remaining bits of dividend 505 remain in binary-encoded form 507. A top few bits 508 of the divisor 500 may, but are not required to, enter each of two quotient selection logic blocks 509 and 510 in the control section 504 of the divider, these divisor bits are necessary for quotient digit estimation for all radixes greater than two and are optional in the radix-two divider stages of FIG. 5. A pipeline latch for the dividend during a first iteration and for a partial remainder during further iterations of the division is shown at 515 and 516.

The one-hot encoded portion 517 of the dividend enters the first quotient selection logic 509, which generates a quotient digit 519, here q(i+1), selected from the set {-1, 0,+1}, as this embodiment comprises two cascaded stages of radix-2 SRT division. The dividend enters the control section 504 of the divider through a one-hot pipeline register 515, the output 517 of which enters the first quotient selection logic 509. A group of one-hot adders 520 subtract the upper portion of the possible divisor products 502 and 503 from the dividend or partial remainder 517 upper portion, the outputs of which are fed to partial remainder selection multiplexor 521, with the output 517 of pipeline register 515 that is the sum when the quotient digit 519 is zero. A barrel shifter array of multiplexers is used for one-hot addition and subtraction, with output remaining in one-hot form. Partial remainder selection multiplexor 521 produces a partial remainder 522 most significant portion.

The low, binary encoded, portion of the dividend enters the datapath 504a section of the divider through quotient/partial remainder low portion pipeline register 516. The quotient digit 519 also controls a partial remainder selection multiplexor 525 in the datapath 504a portion of the divider. Multiplexor 525 selects between the pipeline register 516 and the sums of the possible products 526 (formed by subtracting the lesser bits of the divisor products 502 and 503 from the contents of the pipeline register 516 in an array of carry-save adders 527). This multiplexor 525 produces a low, binary encoded, portion of a partial remainder 528.

The most significant bit, both of the sum vector and carry vector, of the low portion partial remainder 528 are considered by the second stage quotient selection logic 510.

The most significant bit portion 522 of the first partial remainder enters the second quotient selection logic 510, generating a second quotient digit 530. A one-hot adder array 531 produces a set of possible partial remainders 532, which, along with the most significant bit portion 522 of the first partial remainder, are selected according to the second quotient digit 530 by a second high portion partial remainder selection multiplexor 533 to produce a second partial remainder high portion 534.

The low, binary encoded, partial remainder portion 528 also enters a set of adders 540 that produce a set of possible differences 541 of quotient digit times the divisor. The second quotient digit 530 selects between these possible differences 541 in multiplexor 542 to produce a low, binary encoded, portion of a second partial remainder 543. This low portion of the second partial remainder is shifted by a partial remainder shifter (not shown) and redeposited in the dividend/partial remainder low portion pipeline register 516. Since the partial remainder shifter need shift only by a constant number of bit positions, it is implemented by wiring partial remainder 543 bits N to input bits N+n of dividend/partial remainder register 516.

A few upper bits 544 of the low portion of the second partial remainder 543, together with the second partial remainder high portion 534, are processed into a shifted, one-hot encoded top portion 545 by a propagator 546, and deposited into one-hot pipeline register 515.

The quotient digits 519 and 530 are assembled into a quotient by a quotient assembly register (not shown).

Figure 6:
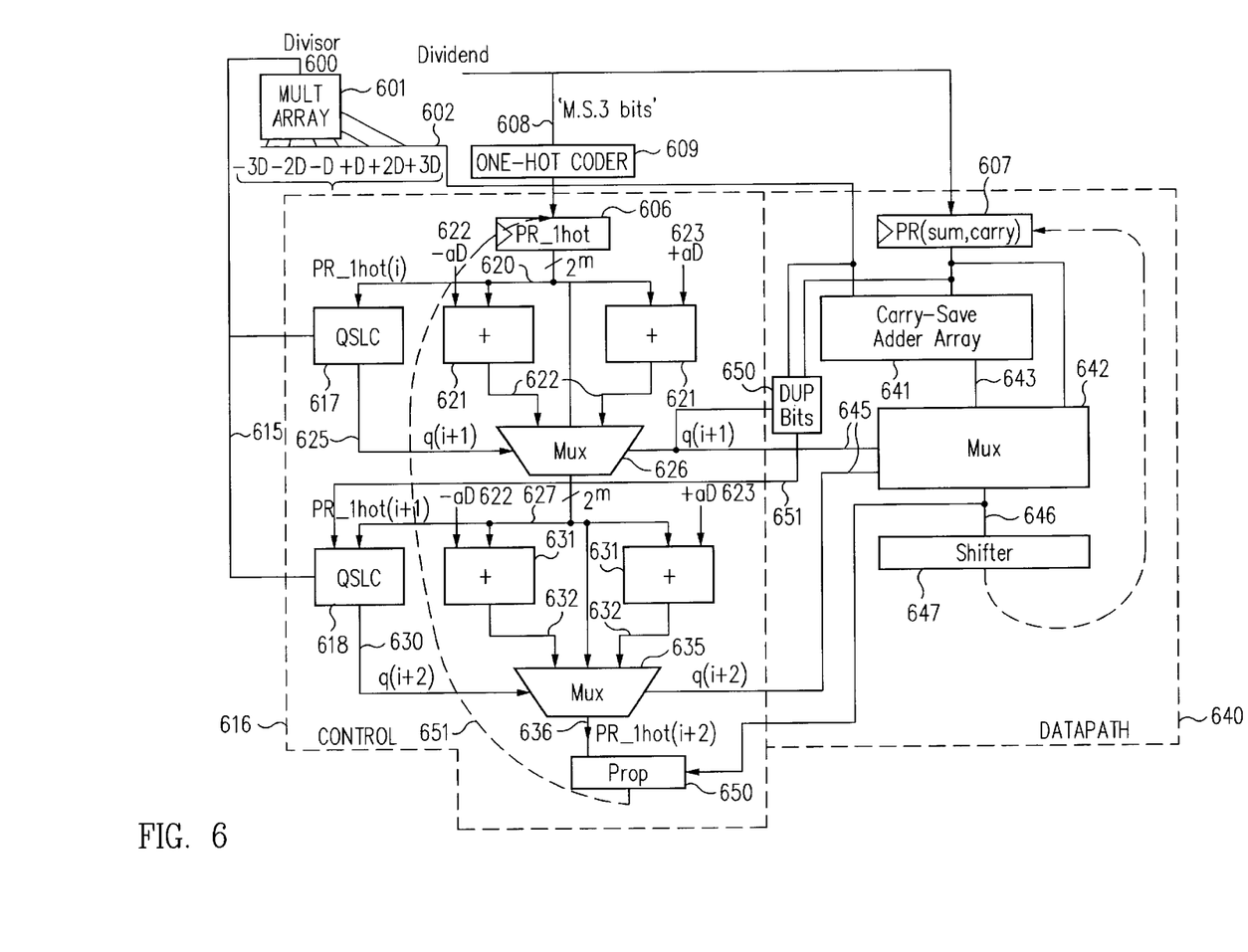
FIG. 6 a block diagram of the core of a high-speed SRT divider embodying the present invention, generating two quotient bits per cycle, and having a merged datapath section with speculative execution.

An alternative embodiment having a two-bit merged datapath section is portrayed in FIG. 6. In this embodiment, divisor 600 enters through a multiplier array 601 that provides all the possible products of a pair of single quotient digits times the divisor 602: minus three times the divisor, minus two times the divisor, minus the divisor, the divisor, two times the divisor, and three times the divisor. Zero times the divisor is optimized out of the logic.

The dividend 605 enters the alternative embodiment of FIG. 6 into dividend/partial remainder high part one-hot encoded pipeline register 606 and dividend/partial remainder low portion pipeline register 607. The most significant three bits 608 of dividend 605 enter the pipeline register 606 through a one-hot encoder 609.

As with the embodiment of FIG. 5, the most significant bits 615 (FIG. 6) of the divisor 600 may enter the control section 616 of the embodiment of FIG. 6 into a first 617 and a second 618 quotient selection logic element. The contents 620 of the high part pipeline register 606 also enter the first 617 quotient selection logic and a one-hot encoded adder array 621. Adder array 621 adds the high portions of the minus divisor and plus divisor terms of the possible products of a pair of single quotient digits times the divisor 602 to the contents 620 of the high part pipeline register 606, producing an array of sums 622.

The first quotient selection logic 617 produces a first quotient digit 625, that controls a first partial remainder top portion multiplexor 626 to generate a first partial remainder top portion 627. Unlike the embodiment of FIG. 5, no first partial remainder lower portion is produced.

The first partial remainder top portion 627 is fed to the second quotient digit selection logic 618 to generate a second quotient digit 630, and to a one-hot encoded adder barrel shifter array 631 that adds the high portions of the minus divisor and plus divisor terms of the possible products of a pair of single quotient digits times the divisor 602, producing an array of sums 632.

The second quotient digit 630 then controls a second partial remainder top portion multiplexor 635 to generate a second partial remainder top portion 636.

In the datapath 640 portion of the divider of FIG. 6, a binary-encoded portion of the low portion pipeline register 607 is fed to a carry-save adder array 641 and to a low portion partial remainder selection multiplexor 642. The array of possible products of a pair of single quotient digits times the divisor 602 is also fed to carry-save adder array 641, which produces an array of all the possible differences 643 of the low portion pipeline register 607 and the possible products of a pair of single quotient digits times the divisor 602.

The first 625 and second 630 quotient digits are combined 645 to control the low portion partial remainder selection multiplexor 642, which selects a low portion partial remainder 646. The low portion partial remainder 646 is shifted by a shifter 647, before being latched in the low portion pipeline register 607. The most significant bits of the low portion partial remainder 646 and the second partial remainder top portion 636 are combined and shifted in propagator 650 to produce a new one-hot encoded partial remainder high portion 651 that is latched into the high part pipeline register 606.

In operation, in a preliminary cycle, the dividend mantissa portion from an exponent/mantissa splitter has its most significant bits one-hot encoded by encoder 609 and is latched into the pipeline registers 606 and 607, and the divisor 600 is presented to the multiplier array 601.

In a first iteration, a first two, most significant, bits of quotient are generated by quotient selection logic elements 617 and 618, these quotient bits then generate a first iteration partial remainder one-hot encoded high portion at propagator 650 and a binary-encoded first iteration partial remainder low portion at shifter 647, these first iteration partial remainders are latched into pipeline registers 606 and 607. This quotient bit pair is latched into the quotient assembly register most significant bits.

In a second and subsequent iterations, additional quotient bit pairs are generated by quotient selection logic elements 617 and 618, these quotient bits being used to generate further iteration partial remainder one-hot encoded high portions at the output of propagator 650 and a binary-encoded further iteration partial remainder low portions at the output of shifter 647. The further iteration partial remainders are latched into the pipeline registers 606 and 607. These quotient bit pairs are latched into the quotient assembly register next most significant bits. A counter and appropriate control logic (not shown) control which bits of the quotient assembly register are loaded in each iteration and the number of iterations.

In this implementation, the second quotient selection logic 618 requires information equivalent to the result of the most significant bits of the lower portion subtraction. This is obtained by duplication logic 650, that uses the most significant two bits of the lower section dividend/partial remainder register 607, a few bits from the −D and +D possible digit products times the divisor 602, and the first quotient selection logic 617 output 625, to generate the equivalent 651 of the most significant bit of an intermediate partial remainder lower portion.

Upon completion of sufficient iterations, an assembled quotient is present in the quotient assembly register. The redundancies in the assembled quotient are reduced by carry propagation logic of the type known in the art of SRT dividers and normalized as required.

Figure 7:
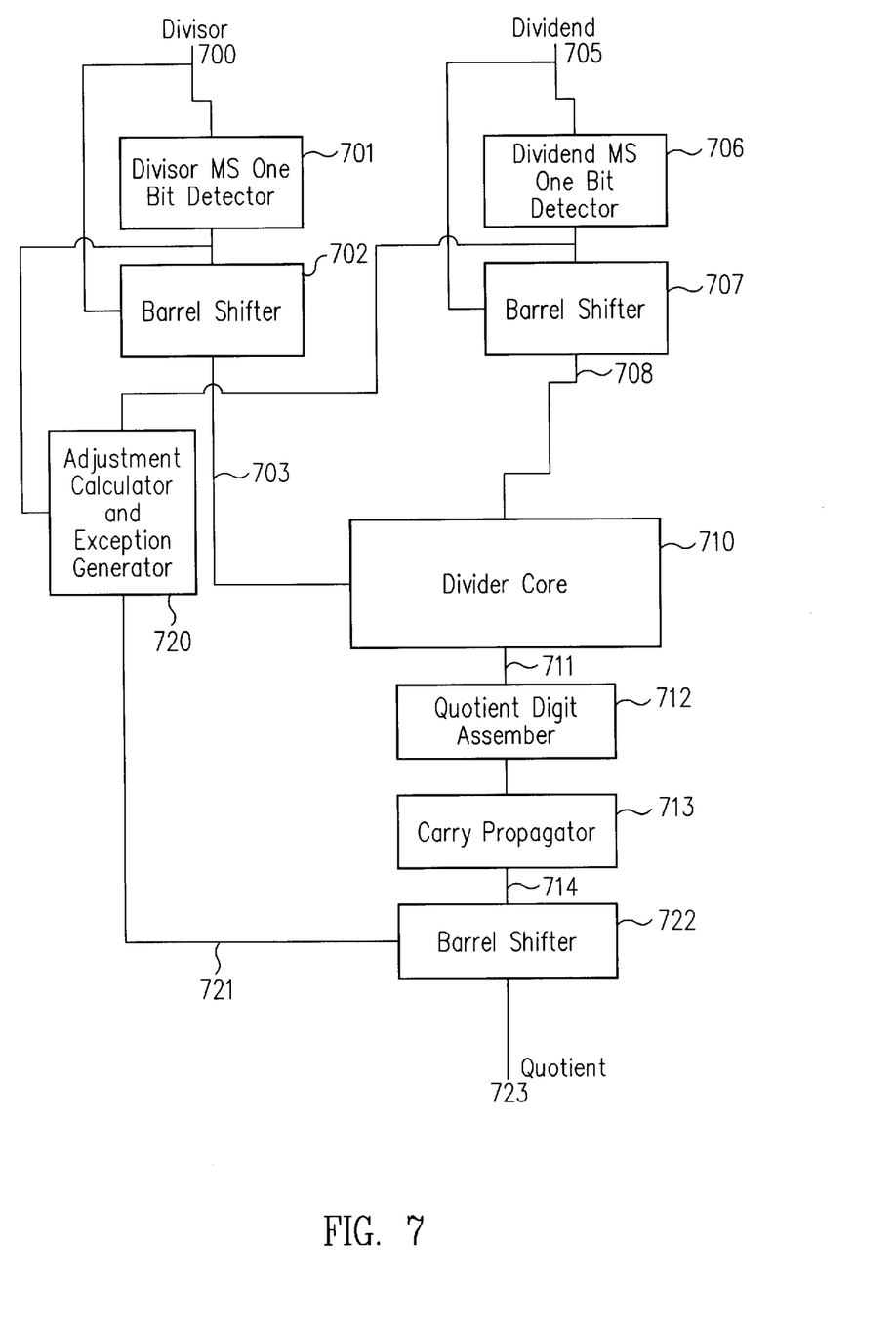
FIG. 7 a block diagram of an integer divider embodying an SRT divider having one-hot encoded most significant bits of each partial remainder.

A one-hot encoded SRT divider embodying the present invention may also be used to perform integer division, as shown in FIG. 7. In this embodiment, positive integers are assumed, signed integers may be converted to positive integers by logic well known in the art, or the divider may be designed to handle signed integers by converting the one-bit detectors disclosed to detectors of the first bit that does not match the sign bit.

An integer divisor 700 enters through a one-bit detector 701, that detects the identity of the most significant bit that does not match the sign (zero for positive integers) of the divisor. A barrel shifter 702 left-shifts the divisor 700 such that the most significant bit that does not match the sign is in the most significant bit position of a shifted divisor 703.

Similarly, an integer dividend 705 enters through a one-bit detector 706, that detects the identity of the most significant bit that does not match the sign (zero for positive integers) of the dividend. A barrel shifter 707 left-shifts the dividend 705 such that the most significant bit that does not match the sign is in the most significant bit position of a shifted dividend 708.

The shifted divisor 703 and shifted dividend 708 then enter a divider core 710, such as the divider core of FIG. 6, that performs the division iterations and produces a sequence of quotient digits 711. The quotient digits 711 are assembled in a quotient digit assembler 712, and redundancy is removed to form a binary quotient in carry propagator 713 to form a raw quotient 714.

An adjustment calculator and exception generator 720 examines the bit count of the most significant bits of both divisor and dividend as reported by the one-bit detectors 701 and 706. The adjustment calculator determine a count 721 of bit positions by which the raw quotient 714 must be shifted by a barrel shifter 722 to form a correct integer quotient 723. The adjustment calculator and exception generator 720 also determines when a divide by zero error condition must be reported.

Figure 8:
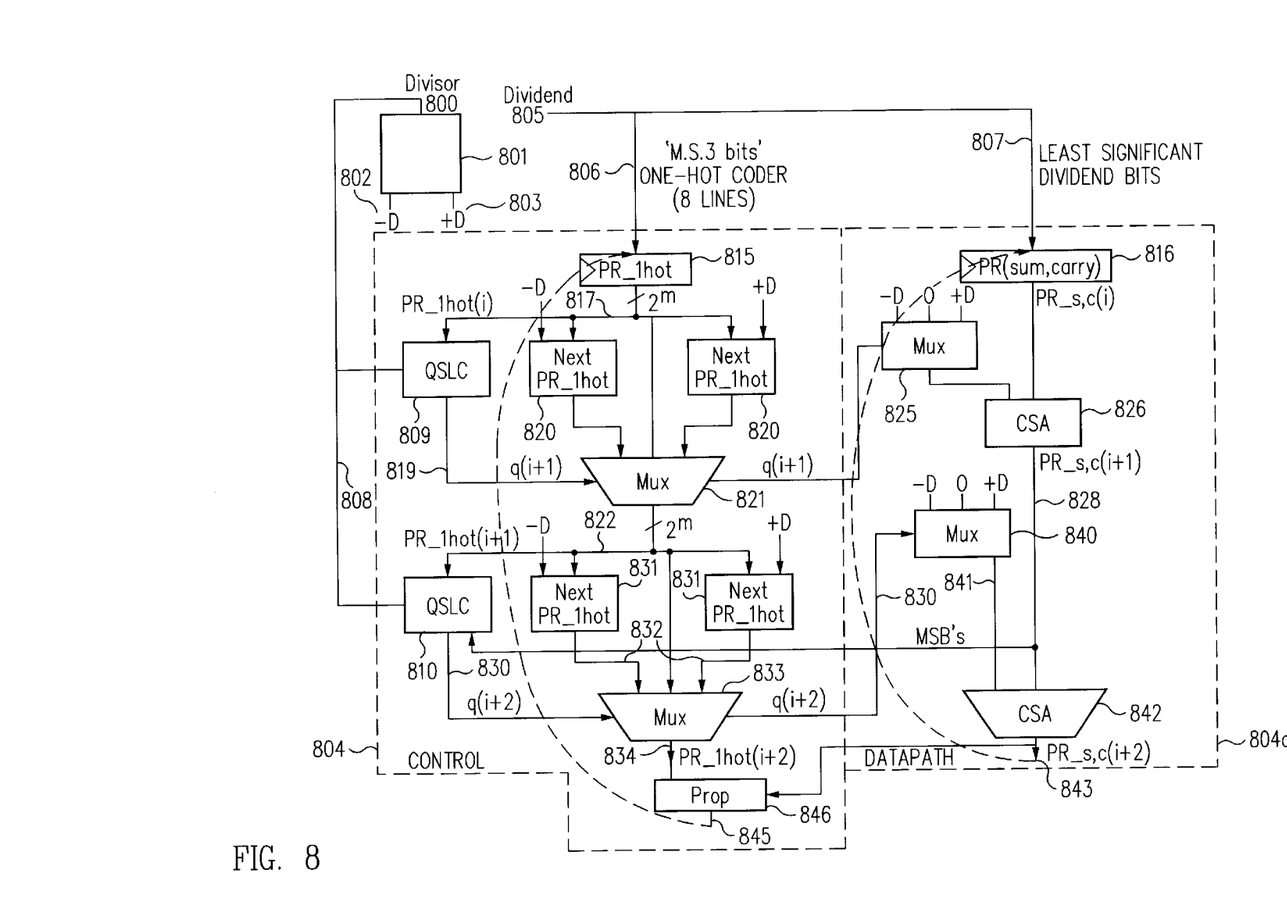
FIG. 8 a block diagram of a high speed SRT divider embodying the present invention, generating two quotient bits per cycle, but without speculative execution.

The core of an SRT divider embodying one-hot coding of the most significant bits of the dividend, unrolled to generate two bits of quotient per cycle, and without speculative execution in subtraction to form the next partial remainder is detailed in FIG. 8. The divisor 800 enters a divisor multiplier 801 that generates the possible products of possible quotient digits times the divisor, including negative one times the divisor 802 and one times the divisor 803. A third possible product, zero, equal to a possible quotient digit of zero times the divisor, is optimized out of the logic. The divider is divided into a control section 804 that operates upon the one-hot coded portion 806 of the dividend or partial remainder 805, and a datapath section 804a that operates upon the binary encoded portion 807 of the dividend or partial remainder.

A dividend 805 enters with its most significant binary three bits recoded into eight lines of one-hot encoded form 806. Remaining bits of dividend 805 remain in binary-encoded form 807. A top few bits 808 of the divisor 800 may enter each of two quotient selection logic blocks 809 and 810 in the control section 804 of the divider, these bits must enter the quotient selection logic in divider stages having radix greater than two, the may optionally enter the quotient selection logic in the divider having two cascaded radix-two stages illustrated in FIG. 8. A pipeline latch for the dividend during a first iteration and for a partial remainder during further iterations of the division is shown at 815 and 816.

The one-hot encoded portion 817 of the dividend enters the first quotient selection logic 809, which generates a quotient digit 819, here q(i+l), selected from the set {−1, 0,+1}, as this embodiment comprises two cascaded stages of radix-2 SRT division. The quotient enters the control section 804 of the divider through a one-hot pipeline register 815, the output 817 of which enters the first quotient selection logic 809. A group of one-hot adders 820 add the most significant bits of the possible divisor products 802 and 803, the outputs of which are fed to partial remainder selection multiplexor 821, with the output 817 of pipeline register 815 that is the sum when the quotient digit 819 is zero. A barrel shifter array of multiplexers is used for one-hot addition or subtraction, as required, with output remaining in one-hot form. Partial remainder selection multiplexor 821 produces a partial remainder 822 most significant portion. This embodiment therefore uses speculative execution in computing the high, one-hot encoded, bits of each partial remainder.

The low, binary encoded, portion of the dividend enters the datapath 804a section of the divider through quotient/partial remainder low portion pipeline register 816. The quotient digit 819 also controls an operand selection multiplexor 825 in the datapath 504a portion of the divider. Multiplexor 825 selects between the possible products of the quotient digit times the divisor, including minus the divisor 802, zero, and the divisor 803. The selected product of the quotient digit times the divisor is subtracted from the partial remainder low portion in the pipeline latch 816 by a carry save adder 826. Carry save adder 826 produces a low, binary encoded, portion of a partial remainder 828 without speculative execution of the subtraction. The most significant bits of the low portion partial remainder 828 are considered by the second quotient selection logic 810.

The most significant bit portion 822 of the first partial remainder enters the second quotient selection logic 810, generating a second quotient digit 830. A one-hot adder array 831 produces a set of possible partial remainders 832, which, along with the most significant bit portion 822 of the first partial remainder, are selected according to the second quotient digit 830 by a second high portion partial remainder selection multiplexor 833 to produce a second partial remainder high portion 834.

The second quotient digit 830 selects between the possible products −D, 802, zero, and +D 803 of a quotient digit and the divisor 800 in a multiplexor 840 to form a selected product 841. Selected product 841 is subtracted by a carry-save adder 842 from the intermediate partial remainder 828 to produce a low, binary encoded, portion of a second partial remainder 843. This low portion of the second partial remainder is shifted by a partial remainder shifter (not shown) and redeposited in the dividend/partial remainder low portion pipeline register 816. Since the partial remainder shifter need shift only by a constant number of bit positions, it is implemented by wiring partial remainder 843 bits N to input bits N+n of dividend/partial remainder register 816.

A few upper bits 844 of the low portion of the second partial remainder 843, together with the second partial remainder high portion 834, are processed into a shifted, one-hot encoded top portion 845 by a propagator 846, and deposited into one-hot pipeline register 815.

The quotient digits 819 and 830 are assembled into a quotient by a quotient assembly register (not shown).

The invention has been shown with reference to particular preferred embodiments. It will be understood by those skilled in the art that various changes in form and details may be made without departing from the spirit and scope of the invention. For example, the number of dividend and partial remainder most significant bits that are one-hot encoded may be increased from three to a higher number such as six (for radix four operation), as may be desirable in operating at an effective radix. The number of bits of quotient, divisor, and dividend may vary from the embodiments set forth, the effective radix may be some other value than two or four, and the number of iterations will vary with effective radix and operand lengths. Further, the multiport register file may be divided into separate register arrays for the integer and for the floating point pipelines. It is understood that the invention is defined by the scope of the following claims.

What is claimed is:

1. A divider for use in a computer system, the divider dividing a dividend V by a divisor D and producing a quotient Q, the divider comprising:
    circuitry for estimating a quotient digit $Q_n$;
    circuitry for computing a partial remainder $R_n$ by subtracting P, the product of the quotient digit Qn times the divisor D, from a value selected from the set consisting of the dividend and a previous partial remainder $R_{n-1}$, the effectively most significant bits of partial remainder $R_n$ being one-hot encoded with less significant bits of $R_n$ being binary coded, and the effectively most significant bits of the set consisting of the dividend V and the previous partial remainder $R_{n-1}$ being one-hot encoded; and
    circuitry for assembly the quotient digit $Q_n$ into a quotient.

2. The divider of claim 1 wherein the circuitry for circuitry for computing a partial remainder $R_n$ further comprises:
    circuitry for computing a set of the products of all possible values of the quotient digit $Q_n$ times the divisor D;
    circuitry for selecting a product P from one of the set of the products of all possible values of the quotient digit $Q_n$ times the divisor D, the selection being made according to the quotient digit $Q_n$; and
    circuitry for subtracting product P from a value selected from the set consisting of the dividend V and a previous partial remainder $R_{n-1}$, to form a difference that becomes the partial remainder $R_n$.

3. The divider of claim 2, wherein the divider operates in a radix greater than two.

4. The divider of claim 1 wherein the circuitry for computing a partial remainder Rn further comprises:

- circuitry for computing a set P{ } of the products of all possible values of the quotient digit Qn times the divisor D;
- circuitry for forming a set of differences RD{ } by subtracting each element of the set P{ } from the divisor D, and circuitry for generating the partial remainder $R_n$ by selecting an element of the set RD{ }; and
- circuitry for subtracting product P from a value selected from the set consisting of the dividend V and a previous partial remainder $R_{n-1}$ to form a difference that becomes the partial remainder $R_n$.

5. A computer program product for performing division in a computer system, the division dividing a dividend V by a divisor D to produce a quotient Q, the computer program product comprising instructions for:

a) recoding at least two most significant bits of the dividend V into one-hot encoded form;
b) estimating a quotient digit Q1;
c) computing P1, a product of the quotient digit Q1 times the divisor D;
d) computing a partial remainder R1, by subtracting P1 from the dividend V;
e) estimating an additional quotient digit $Q_n$, where n is initially 1;
f) computing $P_n$, the product of the quotient digit $Q_n$ times the divisor D;
g) computing a partial remainder $R_n$, by subtracting $P_n$ from the previous partial remainder $R_{n-1}$, where $R_{n-1}$ is initially $R_1$, and wherein at least two of the most significant bits of partial remainder $R_n$ are in one-hot encoded form.
h) repeating steps (e), (f), and (g) as required to produce all necessary bits of the quotient; and
i) assembling the quotient digits Q1 and at least one quotient digit $Q_n$ into a quotient.

6. The computer program product for performing division in a computer system of claim 5, wherein a look-up table is used to perform the step of estimating a quotient digit Q1 in one-hot encoded form.

7. The computer program product for performing division in a computer system of claim 5, further comprising the step of latching a partial remainder Rn in carry-save form into a register, and wherein at least two iterations of the repetition of (e), (f), and (g) are performed between at least one adjacent occurrences of the step of latching a partial remainder.

8. The computer program product for performing division in a computer system of claim 7, wherein speculative execution is used during subtraction to compute two or more most significant bits of partial remainder Rn during the step of computing $R_n$ by subtracting, but speculative execution is not used during subtraction to compute at least one least significant bits of partial remainder $R_n$.

9. The computer program product for performing division in a computer system of claim 5, wherein the partial remainders R, are stored in carry-save form, and further comprising the step of propagating a carry in a final partial remainder to produce a remainder in binary form.

10. The computer program product for performing division in a computer system of claim 5, wherein the partial remainders $R_n$ are stored in carry-save form, and further comprising the step of removing redundancy in an assembled quotient to produce a quotient in binary form.

* * * * *